US012673455B2

(12) United States Patent　　　(10) Patent No.: US 12,673,455 B2
Hirano et al.　　　　　　　　　　(45) Date of Patent: Jul. 7, 2026

(54) MOLDING MACHINE

(71) Applicant: THE JAPAN STEEL WORKS, LTD., Tokyo (JP)

(72) Inventors: Takayuki Hirano, Tokyo (JP); Kazuma Hamada, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 338 days.

(21) Appl. No.: 17/768,842

(22) PCT Filed: Oct. 15, 2019

(86) PCT No.: PCT/JP2019/040485
§ 371 (c)(1),
(2) Date: Apr. 13, 2022

(87) PCT Pub. No.: WO2021/074964
PCT Pub. Date: Apr. 22, 2021

(65) Prior Publication Data
US 2023/0241824 A1　　Aug. 3, 2023

(51) Int. Cl.
*B29C 45/00*　　(2006.01)
*B29C 45/03*　　(2006.01)
(Continued)

(52) U.S. Cl.
CPC ............ *B29C 45/768* (2013.01); *B29C 45/00* (2013.01); *B29C 45/03* (2013.01); *B29C 45/26* (2013.01); *B29C 45/76* (2013.01); *B29C 45/84* (2013.01); *B29C 2945/76103* (2013.01); *B29C*

*2945/76187* (2013.01); *B29C 2945/7619* (2013.01); *B29C 2945/76481* (2013.01)

(58) Field of Classification Search
CPC ........... B29C 2945/76187; B29C 2945/76481; B29C 45/768; G01L 1/2206; G01L 3/108; G01D 11/30
See application file for complete search history.

(56) References Cited

U.S. PATENT DOCUMENTS 4,663,975 A * 5/1987 Parkinson ............... G01L 1/106
73/778
5,019,814 A * 5/1991 Biggs ................... H04B 10/801
250/551
(Continued)

FOREIGN PATENT DOCUMENTS

CN　　206434314 U　　8/2017
CN　　107127951 A　　9/2017
(Continued)

OTHER PUBLICATIONS https://www.phaseivengr.com/products/sensors/strain-gauge/ (Year: 2014).*
(Continued)

*Primary Examiner* — JaMel M Nelson
*Assistant Examiner* — Andres E. Behrens, Jr.
(74) *Attorney, Agent, or Firm* — Potomac Law Group, PLLC

(57) ABSTRACT
The molding machine includes a cylinder, a screw built in the cylinder, and a state detection device. The state detection device includes a sensor for detecting a state of the screw. The state detection device is attached to the screw outside the cylinder.

15 Claims, 6 Drawing Sheets

(51) Int. Cl.

| | | |
|---|---|---|
| *B29C 45/26* | (2006.01) | |
| *B29C 45/76* | (2006.01) | |
| *B29C 45/84* | (2006.01) | |

(56) References Cited

U.S. PATENT DOCUMENTS

| | | | | |
|---|---|---|---|---|
| 7,077,637 | B2 * | 7/2006 | Hsu ..................... | B29C 45/5008 |
| | | | | 425/140 |
| 7,402,036 | B2 * | 7/2008 | Schmidt .................. | B29C 45/07 |
| | | | | 425/150 |
| 2004/0255694 | A1 * | 12/2004 | Mackel ................. | G01L 3/1457 |
| | | | | 73/862 |
| 2008/0305201 | A1 | 12/2008 | Maruyama et al. | |
| 2009/0135016 | A1 | 5/2009 | Yamaguchi et al. | |
| 2010/0062095 | A1 * | 3/2010 | Cadonau ............... | G01L 5/0042 |
| | | | | 425/170 |
| 2015/0135847 | A1 * | 5/2015 | Takahama .............. | G01D 11/30 |
| | | | | 73/856 |
| 2017/0246789 | A1 * | 8/2017 | Siebigteroth ....... | B29C 48/9135 |
| 2018/0003575 | A1 * | 1/2018 | Pollard .................. | B29C 45/77 |
| 2018/0080840 | A1 * | 3/2018 | Gleeson ................. | G01L 3/242 |
| 2022/0214238 | A1 * | 7/2022 | Gest ...................... | G01L 3/1457 |

FOREIGN PATENT DOCUMENTS

| | | | |
|---|---|---|---|
| DE | 102011107198 | B4 | 5/2016 |
| JP | 2001-129870 | A | 5/2001 |
| JP | 2004-132843 | A | 4/2004 |
| JP | 2004132843 | * | 4/2004 |
| JP | 2008-302527 | A | 12/2008 |
| JP | 2017-165097 | A | 9/2017 |
| WO | WO-2005002829 | A2 * | 1/2005 ............ B29C 45/77 |
| WO | WO 2013/168720 | A1 | 11/2013 |

OTHER PUBLICATIONS https://www.torqsense.com/wireless-strain-gauge/ (Year: 2014).* https://durhamgeo.com/products/spot-weldable-strain-gauges/ (Year: 2018).* https://tml.jp/e/product/strain_gauge/gaugemate.html (Year: 2016).* https://tml.jp/e/product/strain_gauge/coating_rein.html (Year: 2002).*

Translation of JP2004132843 https://patents.google.com/patent/JP2004132843A/en?oq=JP2004132843 (Year: 2004).*

WO-2005002829-A2 (Horst) Jan. 2005 (online machine translation), [Retrieved on Feb. 20, 2025]. Retrieved from: Espacenet (Year: 2005).*

International Search Report from International Patent Application No. PCT/JP2019/040485, Nov. 26, 2019.

Office Action issued Dec. 20, 2022, in Japanese Patent Application No. 2021-552013.

Office Action issued Feb. 27, 2024, in Chinese Patent Application No. 201980101263.2.

Office Action issued Jun. 4, 2024, in German Patent Application No. 112019007820.8.

* cited by examiner

MOLDING MACHINE

TECHNICAL FIELD

The present invention relates to a molding machine, and relates to, for example, a molding machine including a cylinder and a screw built in the cylinder.

BACKGROUND ART

The molding machine includes a cylinder and a screw built in the cylinder, and the raw material introduced into the cylinder is kneaded, transported, melted, etc. by the screw rotating in the cylinder. As the molding machine, for example, an extruder can be presented.

For example, Japanese Unexamined Patent Application Publication No. 2001-129870 (Patent Document 1) describes a technology relating to an extruder.

RELATED ART DOCUMENTS

Patent Documents

Patent Document 1: Japanese Unexamined Patent Application Publication No. 2001-129870

SUMMARY OF THE INVENTION

Problems to be Solved by the Invention

If the screw is damaged in the molding machine, it takes time and effort to replace the screw. The production of resin products using the molding machine must be suspended until the screw replacement is completed. Therefore, it is desired to be able to accurately detect the state of the screw while the molding machine is in use in order to facilitate the management of the molding machine and the management of the manufacturing process using the molding machine.

The other problems and novel features will be apparent from the description of this specification and the accompanying drawings.

Means for Solving the Problems

According to one embodiment, a molding machine includes a cylinder, a screw built in the cylinder, and a state detection device. The state detection device includes a sensor for detecting a state of the screw. The state detection device is attached to the screw outside the cylinder.

Also, according to one embodiment, a molding machine includes a cylinder, a screw built in the cylinder, a shaft coupled to the screw outside the cylinder, and a state detection device. The state detection device includes a sensor for detecting a state of the screw. The state detection device is attached to either or both the screw and the shaft outside the cylinder.

Effects of the Invention

According to one embodiment, it is possible to accurately detect the state of the screw of the molding machine.

BRIEF DESCRIPTIONS OF THE DRAWINGS

DETAILED DESCRIPTION OF PREFERRED EMBODIMENTS

Figure 1:
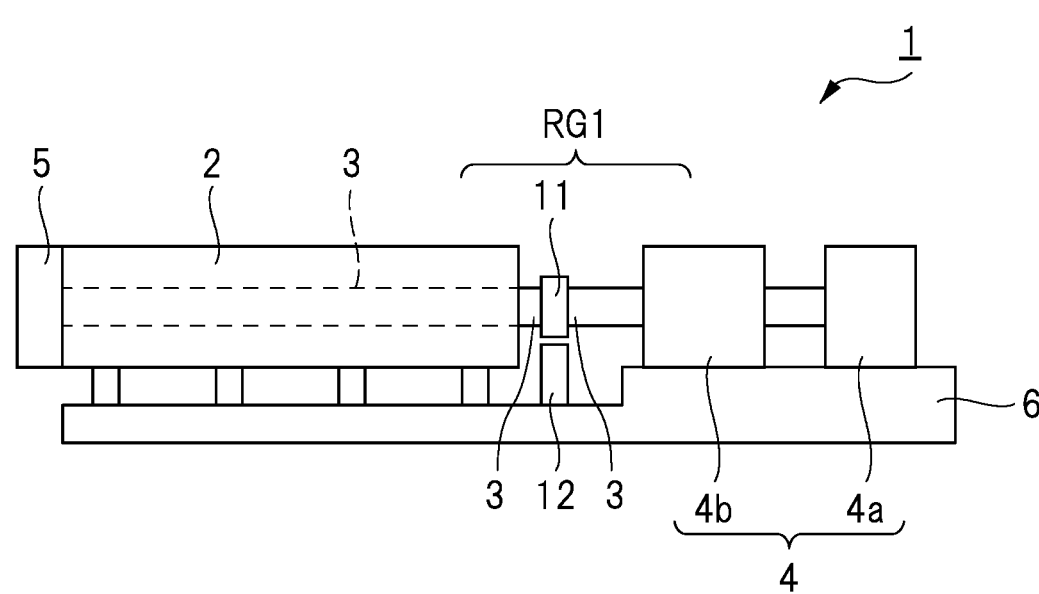
FIG. 1 is a side view of a molding machine according to an embodiment.

Hereinafter, embodiments will be described in detail with reference to drawings. Note that members having the same function are denoted by the same reference characters throughout the drawings for describing the embodiments, and the repetitive description thereof will be omitted. Also, in the following embodiments, the description of the same or similar parts is not repeated in principle unless particularly required.

(First Embodiment)

Figure 2:
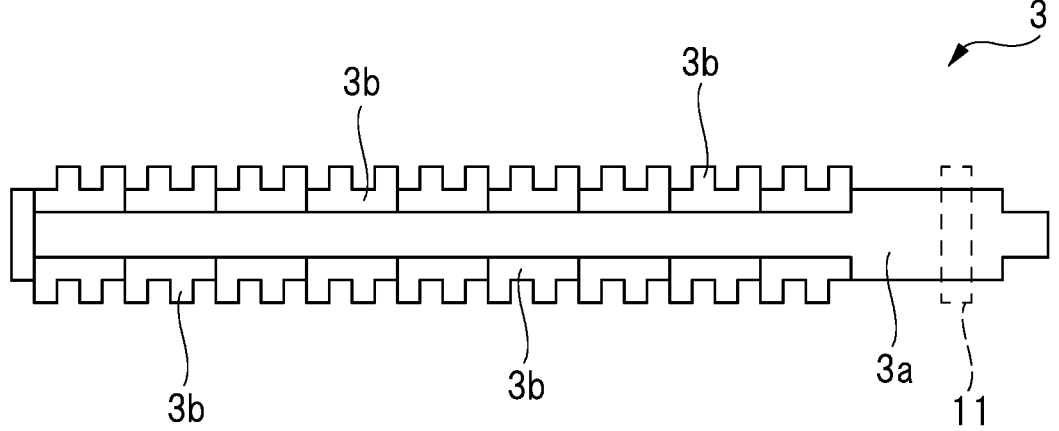
FIG. 2 is a cross-sectional view of a screw of the molding machine according to the embodiment.
Figure 3:
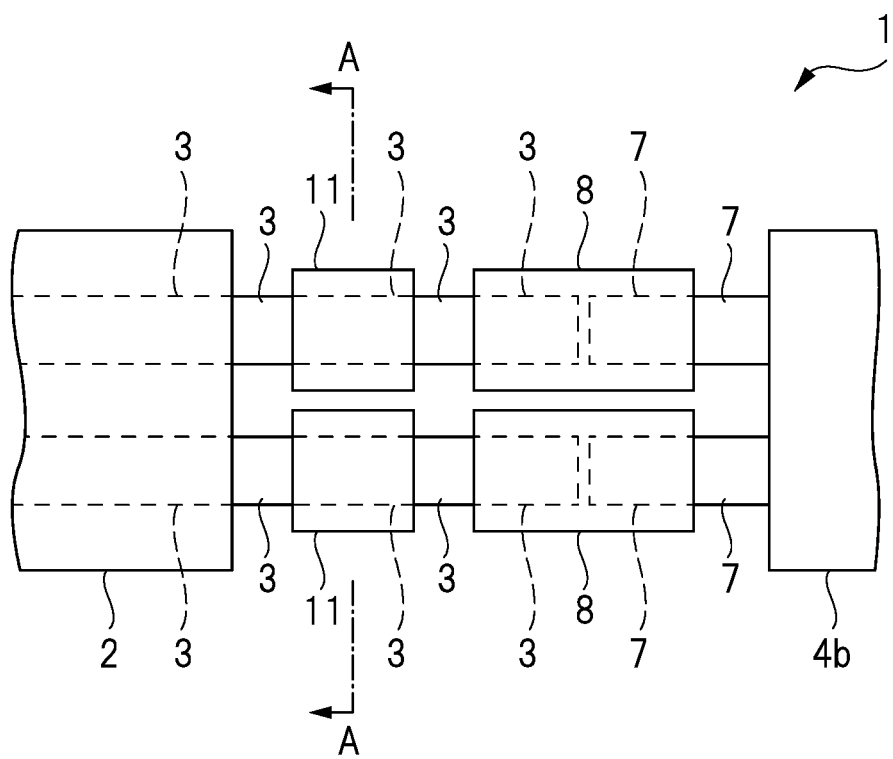
FIG. 3 is a plan view showing the principal part of the molding machine according to the embodiment.
Figure 4:
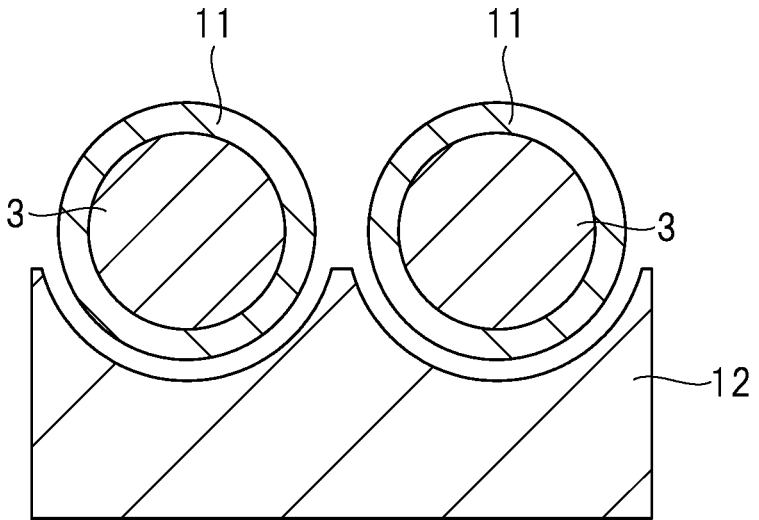
FIG. 4 is a cross-sectional view of the molding machine according to the embodiment.

FIG. 1 is a side view of a molding machine (molding apparatus) 1 according to the present embodiment, FIG. 2 is a cross-sectional view of a screw 3 of the molding machine 1, FIG. 3 is a plan view showing the principal part of the molding machine 1 (partially enlarged plan view), and FIG. 4 is a cross-sectional view of the molding machine 1. In FIG. 2, the attachment position of a telemeter 11 is shown by a dotted line. FIG. 3 shows a plan view (top view) of a region RG1 shown in FIG. 1 as viewed from above. The cross-sectional view at the position of the line A-A in FIG. 3 corresponds to FIG. 4.

The molding machine 1 is a molding machine configured to perform resin molding. In the present embodiment, the case in which the molding machine 1 is an extruder will be described as an example, but as another aspect, an injection molding machine, a magnesium molding machine, a granulator, a film forming machine, a blow molding machine, or the like can also be applied as the molding machine 1.

First, the configuration of the molding machine 1 will be described with reference to FIG. 1 to FIG. 4. The molding machine 1 shown in FIG. 1 to FIG. 4 includes a cylinder (barrel) 2, a screw 3 built in the cylinder 2 for kneading, transporting, and melting a raw material resin, a rotation drive mechanism 4 for rotating the screw 3 in the cylinder 2, and a die (mold) 5 attached to the downstream side tip of the cylinder 2. The molding machine 1 is arranged on a support base 6. The temperature of the cylinder 2 is controlled by a temperature adjusting means (temperature adjusting mechanism) (not shown) such as a heater. An opening (not shown) for introducing a raw material (resin or the like) into the cylinder 2 is formed in the upper surface of the cylinder 2.

The rotation drive mechanism 4 includes a motor 4a and a speed reducer 4b connected to the motor 4a. The speed reducer 4b is interposed between the motor 4a and the screw 3, and the rotational motion of the motor 4a is transmitted to the screw 3 via the speed reducer 4b, whereby the screw 3 is rotated. Specifically, the tip end of an output shaft 7 of the speed reducer 4b and the rear end of the screw 3 are coupled (fixed) by a joint (coupling portion, coupling means) 8, and the screw 3 is also rotated together as the output shaft 7 is rotated. The joint 8 is a member (coupling member) that couples the output shaft 7 and the screw 3. The speed reducer 4b has a function of converting (decelerating) the rotation speed of the motor 4a into the rotation speed suitable for the screw 3. When the rotational motion of the motor 4a is transmitted to the speed reducer 4b, the output shaft 7 of the speed reducer 4b rotates at the rotation speed lower than the rotation speed of the motor, and the screw 3 coupled to the output shaft 7 rotates at the same rotation speed as that of the output shaft 7.

Further, when a filler supply device (not shown) is also used, a desired filler is supplied into the cylinder 2 from the filler supply device.

The screw 3 is inserted and built in the cylinder 2 so as to be movable therein. In the case of FIG. 1 to FIG. 4, two screws 3 are arranged in the cylinder 2, and the molding machine 1 in this case can be regarded as a twin screw extruder. The two screws 3 arranged in the cylinder 2 are rotated so as to mesh with each other.

In the present embodiment, the case in which the twin screw extruder (in this case, two screws) is applied as the molding machine 1 will be described, but it is also possible to apply a single screw extruder (in this case, one screw) or an extruder having three or more screws as the molding machine 1 as another aspect.

Each screw 3 is built in the cylinder 2, but a part of each screw 3 is located outside the cylinder 2. Specifically, a part of each screw 3 protrudes from the rear end (upstream side end) of the cylinder 2. The output shaft 7 of the speed reducer 4b is coupled via the joint 8 to a part of the screw 3 outside the cylinder 2, specifically, a part of the screw 3 protruding from the rear end (upstream side end) of the cylinder 2. The screw 3 and the output shaft 7 are coupled via the joint 8 such that the central axis of the screw 3 (rotation center axis) and the central axis of the output shaft 7 (rotation center axis) match each other.

When mentioning "downstream side" and "upstream side" with respect to the cylinder 2, the "downstream side" means the downstream side of the resin flow in the cylinder 2, and the "upstream side" means the upstream side of the resin flow in the cylinder 2. Therefore, in the cylinder 2, the side closer to the tip of the cylinder 2 is the downstream side, and the side far from the tip of the cylinder 2 is the upstream side. Thus, the rear end of the cylinder 2 is the upstream side end of the cylinder 2. The tip of the cylinder 2 corresponds to the end of the cylinder 2 on the side where the molten resin (kneaded resin) is extruded, and the die 5 is attached to the tip of the cylinder 2.

The die 5 can function to form the molten resin extruded from the cylinder 2 into a predetermined cross-sectional shape and discharge it. In this case, the die 5 is a die for extrusion molding (molding die).

The molding machine 1 according to the present embodiment further includes a telemeter 11 as a state detection device. The telemeter 11 as a state detection device is provided to detect the state of the screw 3. Therefore, the telemeter 11 includes a sensor 23, which will be described later, for detecting the state of the screw 3. The telemeter 11 can also be regarded as a measuring device. In the molding machine 1 according to the present embodiment, the wireless power supply to the telemeter 11 and the wireless data transmission (signal transmission) from the telemeter 11 are possible.

The telemeter 11 is attached to the screw 3 and can function to detect the state of the screw 3. However, the telemeter 11 is attached to the screw 3 outside the cylinder 2 instead of inside the cylinder 2. Namely, the telemeter 11 is attached to a part of the screw 3 located outside the cylinder 2. Specifically, a part of each screw 3 protrudes from the rear end (upstream side end) of the cylinder 2, and the telemeter 11 is attached to a part of the screw 3 protruding from the rear end (upstream side end) of the cylinder 2. Therefore, the telemeter 11 is attached to the screw 3 between the rear end (upstream side end) of the cylinder 2 and the joint 8. When the molding machine 1 includes a plurality of screws 3, it is preferable to attach the telemeter 11 to each of the plurality of screws 3.

The screw 3 has a screw shaft 3a and a plurality of screw pieces 3b attached to the screw shaft 3a (see FIG. 2). The screw pieces 3b are attached to a part of the screw shaft 3a located inside the cylinder 2. The flight of the screw 3 is formed on the screw pieces 3b. As a result, in the cylinder 2, the flight is formed on the surface of the screw 3 (on the surface formed by the screw pieces 3b). When the screw shaft 3a rotates, the screw pieces 3b attached to the screw shaft 3a also rotate together with the screw shaft 3a. The screw shaft 3a has a cylindrical shape. The diameter of the part of the screw shaft 3a to which the screw piece 3b is attached is smaller than the diameter of the part of the screw shaft 3a to which the screw piece 3b is not attached. Thus, the screw piece 3b is not attached to the part of the screw shaft 3a located outside the cylinder 2, that is, to the part of the screw shaft 3a protruding from the rear end (upstream side end) of the cylinder 2.

Therefore, the part of the screw 3 protruding from the rear end (upstream side end) of the cylinder 2 is composed of the screw shaft 3a, and the flight is not formed thereon. The telemeter 11 is attached to the screw 3 outside the cylinder 2, but specifically, it is attached to the screw shaft 3a of the screw 3 outside the cylinder 2.

It is difficult to secure a space for attaching the telemeter 11 on the screw 3 in the cylinder 2. However, in the present embodiment, since the telemeter 11 is attached to the screw 3 outside the cylinder 2, the telemeter 11 can be attached to the screw 3 without the cylinder 2 getting in the way.

In association with attaching the telemeter 11 to the screw 3, the molding machine 1 is provided with a base unit 12 for supplying power (power supply) to the telemeter 11 and receiving data (signal) sent from the telemeter 11.

The base unit 12 is arranged at a position facing the telemeter 11 attached to the screw 3. Specifically, the base unit 12 is arranged below the telemeter 11 attached to the screw 3. The telemeter 11 rotates together with the screw 3 when the screw 3 rotates. Therefore, the base unit 12 and the telemeter 11 are not in contact with each other such that the rotation of the telemeter 11 is not hindered, and there is a gap between the base unit 12 and the telemeter 11. The base unit 12 and the telemeter 11 are not connected by the wiring (that is, are not connected by wire), and wireless communication is possible. Therefore, the interval between the base unit 12 and the telemeter 11 is set so as to enable the wireless power supply from the base unit 12 to the telemeter 11 and the wireless data transmission from the telemeter 11 to the base unit 12.

If the molding machine 1 is a twin screw extruder having two screws 3 or if the molding machine 1 is an extruder having three or more screws 3, it is preferable that the telemeter 11 is attached to each screw 3. In that case, since there are a plurality of telemeters 11, the base unit 12 should be provided so as to face the plurality of telemeters 11. However, the form of the base unit 12 differs depending on the communication method, and for example, the base unit 12 can be divided or the base unit 12 can be arranged at a distance by using an antenna.

Figure 5:
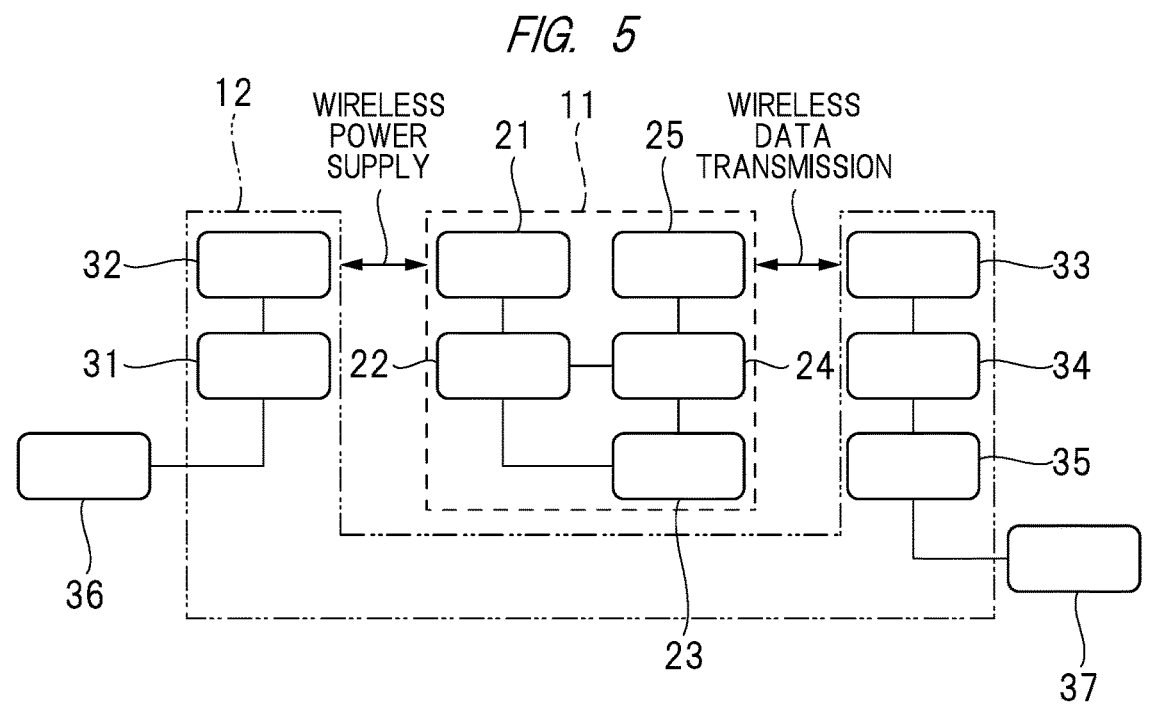
FIG. 5 is a block diagram showing a configuration of a telemeter and a base unit.
Figure 6:
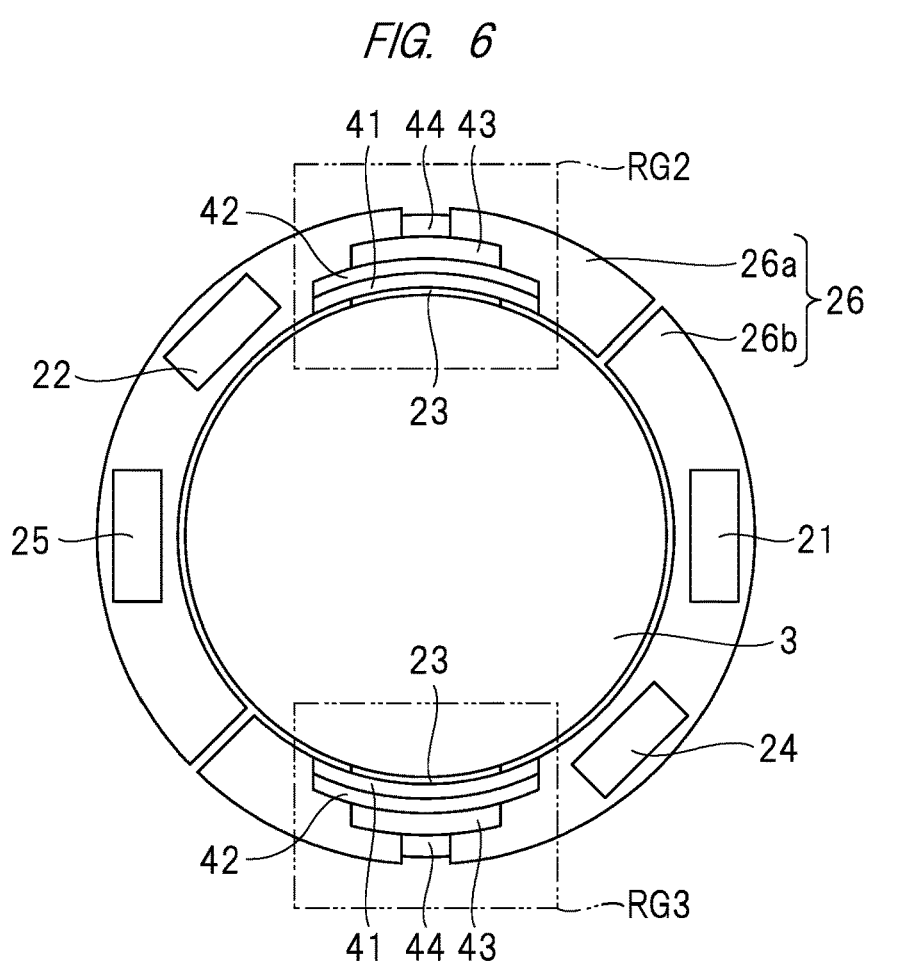
FIG. 6 is a cross-sectional view showing the principal part of the molding machine according to the embodiment.
Figure 7:
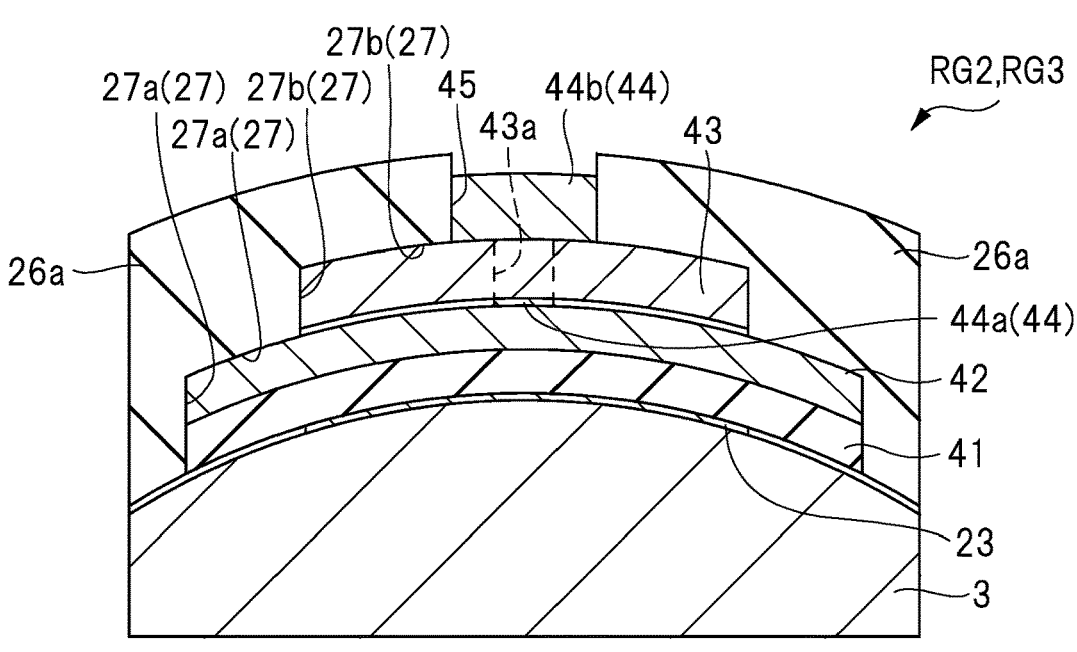
FIG. 7 is a partially enlarged cross-sectional view showing a part of FIG. 6 in an enlarged manner.
Figure 8:
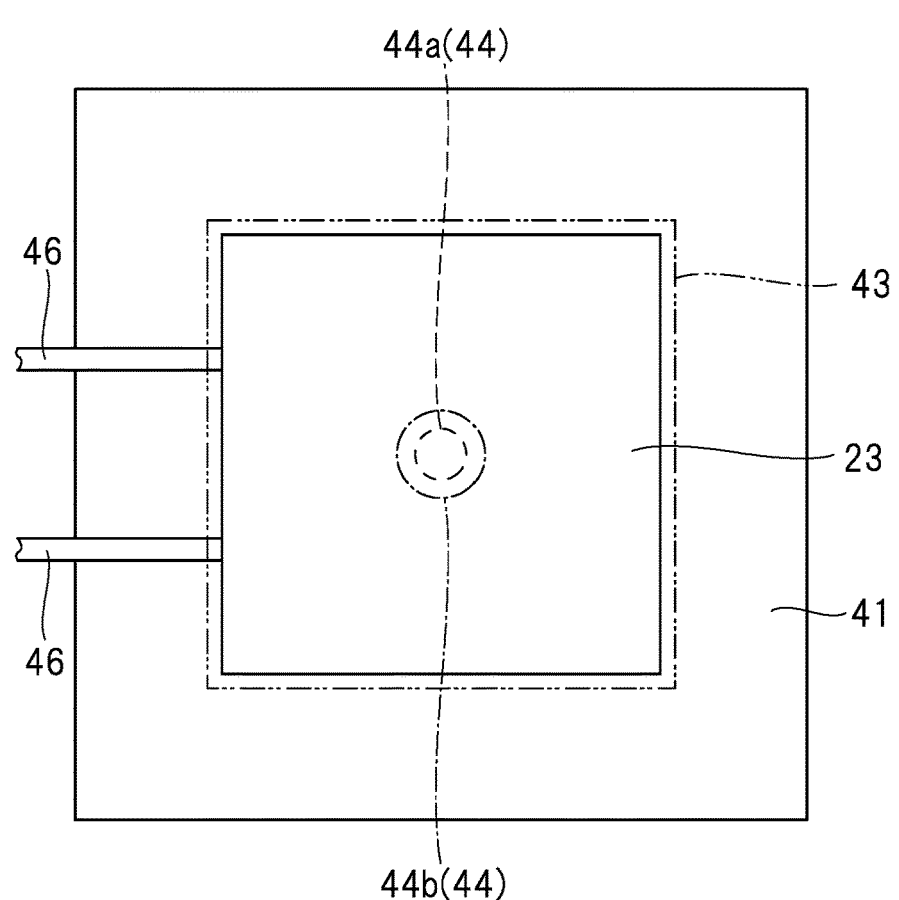
FIG. 8 is a plan view showing the principal part of the telemeter used in the molding machine according to the embodiment.

Next, the configurations of the telemeter 11 and the base unit 12 will be described with reference to FIG. 5 to FIG. 7. FIG. 5 is a block diagram (circuit block diagram) showing the configurations of the telemeter 11 and the base unit 12. In FIG. 5, a portion surrounded by a dotted line is included in the telemeter 11, and a portion surrounded by an alternate long and two short dashes line is included in the base unit 12. FIG. 6 is a cross-sectional view showing the principal part of the molding machine 1, and a part of FIG. 4 is shown in an enlarged manner. Namely, FIG. 6 shows a cross-sectional view of the telemeter 11 and the screw 3 at a position where the telemeter 11 is attached to the screw 3. FIG. 7 is a partially enlarged cross-sectional view showing a part of FIG. 6 in an enlarged manner, and a region RG2 surrounded by an alternate long and two short dashes line in FIG. 6 is shown in an enlarged manner. The enlarged view of a region RG3 in FIG. 6 corresponds to the view obtained by inverting the top and bottom of FIG. 7 and changing a reference character 26a indicating a housing 26a to a reference character 26b indicating a housing 26b. Although FIG. 6 is a cross-sectional view, hatching is omitted in order to make the drawing easier to see. FIG. 8 is a plan view showing the principal part of the telemeter 11, and a planar positional relationship between the sensor 23, an elastic sheet 41, a metal plate 42, a nut plate 43, and a bolt 44 is shown. Although the metal plate 42 is not shown in FIG. 8, the outer peripheral position of the metal plate 42 almost coincides with the outer peripheral position of the elastic sheet 41.

As shown in FIG. 5, the telemeter 11 includes a power receiving coil 21, an AC/DC converter 22, a sensor 23, a processor (control unit, control semiconductor chip) 24, and a data transmitting coil 25. Further, the base unit 12 includes an oscillator 31, a power transmitting coil 32, a data receiving coil 33, an AD converter (analog/digital converter) 34, and a processor (control unit, control semiconductor chip) 35.

Power is supplied from a power source (external power source) 36 provided outside the base unit 12 to the telemeter 11 via the base unit 12. Specifically, the power supplied from the power source 36 to the base unit 12 is sent to the power transmitting coil 32 via the oscillator 31, and an alternating current flows through the power transmitting coil 32. Since the power transmitting coil 32 of the base unit 12 functions as a primary coil and the power receiving coil 21 of the telemeter 11 functions as a secondary coil, an alternating current flows through the power transmitting coil 32, so that an alternating current flows through the power receiving coil 21. Namely, power is supplied wirelessly from the power transmitting coil 32 of the base unit 12 to the power receiving coil 21 of the telemeter 11. Therefore, the base unit 12 includes a power supply unit for the telemeter 11 (here, the oscillator 31, the power transmitting coil 32, and the like).

The AC power (alternating current) sent to the power receiving coil 21 is converted into DC power (direct current) by the AC/DC converter 22 and then supplied to the sensor 23 and the processor 24. This allows the sensor 23 and the processor 24 to operate. The sensor 23 detects the state of the screw 3. Examples of the state of the screw 3 include torsional strain, bending strain, thermal strain, torque, bending, degree of deformation, deformation mode, vibration, degree of vibration, vibration mode, fatigue due to the accumulation thereof, degree of fatigue, and the like. Further, the state detection device (here, the telemeter 11) may be equipped with various sensors and may estimate the state by using the sensor data compositely. In the present embodiment, specifically, since the sensor 23 is a sensor that detects the deformation (shape change, strain) of the screw 3 and is, for example, a strain gauge, the deformation (shape change, strain) of the screw 3 can be detected as a resistance change of the resistor constituting the sensor (strain gauge). Other examples of the sensor included in the state detection device (here, telemeter 11) include a displacement sensor, a speed sensor, an acceleration sensor, a temperature sensor, a gyro sensor, a humidity sensor, a chromaticity/optical sensor, a microphone, and the like.

The processor 24 controls the sensor 23 and sends a signal (data signal) corresponding to the state (deformation, shape change) of the screw 3 detected by the sensor 23 to the data transmitting coil 25. The data transmitting coil 25 of the telemeter 11 functions as a primary coil and the data receiving coil 33 of the base unit 12 functions as a secondary coil, so that a signal (data signal) is wirelessly sent from the data transmitting coil 25 of the telemeter 11 to the data receiving coil 33 of the base unit 12. Namely, data is transmitted wirelessly from the data transmitting coil 25 of the telemeter 11 to the data receiving coil 33 of the base unit 12. The signal (data signal) sent to the data receiving coil 33 is converted by the AD converter 34, subjected to necessary processing by the processor 35, and sent to a personal computer (external PC) 37 outside the base unit 12, and necessary processing and recording of data are performed in the personal computer 37. Therefore, the base unit 12 includes a communication unit for the telemeter 11 (here, the data receiving coil 33, the AD converter 34, the processor 35, and the like). Based on the data sent from the base unit 12 to the personal computer 37, the management of the molding machine 1 and the management of the manufacturing process using the molding machine 1 can be performed. For example, the check of the state of the screw 3, the determination of the replacement time of the screw 3, or the setting or change of the continuous operation time of the molding machine 1 can be performed.

Further, as a method of supplying power to the telemeter 11, the wireless power supply described above can be presented, but environmental power generation (power generation by vibration, light, heat, electromagnetic waves, etc.) may also be possible in addition to it.

Next, a specific structure of the telemeter 11 will be described with reference to FIG. 6 to FIG. 8.

As shown in FIG. 6, the telemeter 11 includes a housing (resin housing) 26 that defines the overall shape of the telemeter 11, the power receiving coil 21, the AC/DC converter 22, the sensor 23, the processor 24, and the data transmitting coil 25.

The housing 26 is preferably made of a non-conductor (insulator), and a resin (resin material) can be preferably used for it. When the housing 26 is made of a metal material, there is a concern that the housing 26 may adversely affect the transmission and reception of electric power and signals (data) between the telemeter 11 and the base unit 12. Therefore, it is desirable that the housing 26 is made of a material that does not hinder the transmission and reception of electric power and signals (data) between the telemeter 11 and the base unit 12. Accordingly, by forming the housing 26 from a material other than metal, preferably a non-conductor (for example, resin), it is possible to suppress or prevent the housing 26 from adversely affecting the transmission and reception of electric power and signals (data) between the telemeter 11 and the base unit 12. As the non-conductor constituting the housing 26, for example, a resin (resin material) is suitable, and when the housing 26 is made of the resin, the housing 26 can be easily manufactured and handled. As the non-conductor constituting the housing 26, for example, ceramic or the like can be used in addition to the resin.

The power receiving coil 21, the AC/DC converter 22, the processor 24, and the data transmitting coil 25 are incorporated in the housing 26. In the case of FIG. 6, the power receiving coil 21, the AC/DC converter 22, the processor 24, and the data transmitting coil 25 are embedded in the housing 26, but they may be arranged in the concave portions formed in the housing 26 as another aspect. The power receiving coil 21, the AC/DC converter 22, the sensor 23, the processor 24, and the data transmitting coil 25 are electrically connected to each other according to need through the wiring or the like provided in the housing 26.

The sensor 23 is arranged in a concave portion 27 provided on the inner surface side of the housing 26. The inner surface of the housing 26 corresponds to the surface on the side facing the screw 3, and the outer surface of the housing 26 corresponds to the surface of the housing 26 on an opposite side of the inner surface of the housing 26.

The sensor 23 is in contact with the surface (outer surface, outer circumference) of the screw 3. Specifically, the sensor 23 is a sensor that detects deformation (shape change, strain) of the screw 3, and is, for example, a strain gauge. Therefore, the sensor 23 includes a resistor, and the resistance of the resistor included in the sensor 23 changes when the screw 3 is deformed. In this way, the deformation of the screw 3 can be detected as the resistance change of the resistor included in the sensor 23. Therefore, it is preferable that the sensor 23 is in close contact with the surface of the screw 3, whereby the deformation of the screw 3 can be accurately detected by the sensor 23. Accordingly, the sensor 23 is preferably pressed to the surface of the screw 3, and a structure capable of achieving it is adopted in the present embodiment.

A structure for pressing the sensor 23 to the screw 3 will be described with reference to FIG. 6 to FIG. 8.

The sensor (strain gauge) 23 is attached to the elastic sheet (elastic body sheet) 41. Note that the sensor 23 is attached to the lower surface of the elastic sheet 41, and the wiring 46 connected to the sensor 23 is also arranged on the lower surface of the elastic sheet 41. Therefore, the sensor 23 is in contact with the elastic sheet 41, specifically, is in contact with the lower surface of the elastic sheet 41. Of both surfaces of the elastic sheet 41, the lower surface of the elastic sheet 41 corresponds to the surface facing the screw 3. The upper surface of the elastic sheet 41 is a surface on an opposite side of the lower surface of the elastic sheet 41, and therefore corresponds to a surface of the elastic sheet 41 on an opposite side of the surface in contact with the sensor 23. Therefore, the sensor 23 is located between the elastic sheet 41 and the screw 3. The sensor 23 is pressed to the screw 3 by the elastic sheet 41.

The elastic sheet 41 is made of an elastic body, for example, silicone rubber. The planar dimension (plane area) of the elastic sheet 41 is larger than the planar dimension (plane area) of the sensor 23, and the sensor 23 is enclosed in the elastic sheet 41 in a plan view. The planar shape of the elastic sheet 41 can be selected from various shapes, and may be, for example, a rectangular shape.

The metal plate 42 is arranged on the elastic sheet 41, that is, on the upper surface of the elastic sheet 41. The planar shape and planar dimension (plane area) of the metal plate 42 are substantially the same as the planar shape and planar dimension (plane area) of the elastic sheet 41. The metal plate 42 is in contact with the upper surface of the elastic sheet 41. Therefore, the elastic sheet 41 is interposed between the metal plate 42 and the sensor 23, and the metal plate 42 is not in contact with the sensor 23. The metal plate 42 is a plate-like (plate-shaped) member, but is not flat and is curved. Namely, the lower surface of the metal plate 42 (the surface in contact with the elastic sheet 41) is a curved surface. The lower surface of the metal plate 42 is preferably a curved surface corresponding to the surface of the part of the screw 3 to which the telemeter 11 is attached. Specifically, the metal plate 42 is preferably curved such that the lower surface of the metal plate 42 and the surface of the screw 3 become substantially parallel in the state where the metal plate 42 is pressed to the surface of the screw 3 via the elastic sheet 41 and the sensor 23 by the bolt (screw, screw member) 44. Therefore, the radius of curvature of the lower surface of the metal plate 42 is preferably about the same as the radius of curvature of the part of the surface of the screw 3 to which the telemeter 11 is attached. Of both surfaces of the metal plate 42, the lower surface of the metal plate 42 corresponds to the surface that is in contact with the elastic sheet 41. The upper surface of the metal plate 42 is the surface on an opposite side of the lower surface of the metal plate 42, and therefore corresponds to the surface on an opposite side of the surface of the metal plate 42 in contact with the elastic sheet 41. The metal plate 42 is pressed to the elastic sheet 41 by the bolt 44.

The nut plate 43 is arranged on the metal plate 42, that is, on the upper surface of the metal plate 42. The nut plate 43 is made of a metal material and is a plate-like (plate-shaped) member. A screw hole 43a penetrating through the nut plate 43 is formed in the nut plate 43, and a screw thread is formed on the side surface (inner wall surface) of the screw hole 43a. The bolt 44 is inserted into the screw hole 43a of the nut plate 43. The nut plate 43 can function as a nut for the bolt 44. The bolt 44 can be regarded also as a screw (screw member).

In the case of FIG. 7, the bolt 44 has a threaded portion 44a having a thread formed on a side surface thereof and a head portion 44b coupled to the threaded portion 44a and having a larger planar dimension than that of the threaded portion 44a. The shape (structure) of the bolt (screw) 44 can be variously changed, and for example, a screw member without the portion corresponding to the head portion 44b can be used instead of the bolt 44. The nut plate 43 has a larger planar dimension (plane area) than a normal nut, and preferably, the plane area of the nut plate 43 is six times or more the plane area of the screw hole 43a of the nut plate 43. Further, in the case of FIG. 7, the planar dimension (plane area) of the nut plate 43 is slightly smaller than the planar dimension (plane area) of the metal plate 42, but the present invention is not limited to this. Of both surfaces of the nut plate 43, the lower surface of the nut plate 43 corresponds to the surface facing the metal plate 42. The upper surface of the nut plate 43 is a surface on an opposite side of the lower surface of the nut plate 43.

When the bolt 44 is tightened in order to improve the contact of the sensor 23 to the surface of the screw 3, the upper surface of the nut plate 43 (the surface on an opposite side of the surface facing the metal plate 42) comes into contact with the housing 26, and applies a force that pushes the housing 26 upward (in the direction away from the screw 3) to the contact portion of the housing 26. Specifically, the upper surface of the nut plate 43 is pressed to the bottom surface of the concave portion 27b of the housing 26, and the force to push the bottom surface of the concave portion 27b of the housing 26 upward (in the direction away from the screw 3) works by the nut plate 43. In the present embodiment, since the nut plate 43 having a larger planar dimension (plane area) than the normal nut is used, even if the force to push the bottom surface of the concave portion 27b of the housing 26 upward works by the nut plate 43, the force does not work locally in a small area, but is distributed throughout the nut plate 43. Therefore, on the bottom surface of the concave portion 27b of the housing 26, the housing 26 is less likely to be damaged, and it is possible to suppress or prevent the housing 26 from being damaged. As a result, the thickness of the housing 26 can be reduced.

The threaded portion 44a of the bolt 44 is inserted into the screw hole 43a of the nut plate 43, and the planar dimension (plane area) of the head portion 44b of the bolt 44 is larger than the planar dimension (flat area) of the screw hole 43a. Since the bolt 44 is inserted into the screw hole 43a of the nut plate 43 from the upper surface side of the nut plate 43, the head portion 44b of the bolt 44 protrudes from the upper surface of the nut plate 43. Further, the length of the threaded portion 44a of the bolt 44 is larger than the thickness of the nut plate 43, and a part of the threaded portion 44a of the bolt 44 protrudes from the lower surface of the nut plate 43. Therefore, the tip of the threaded portion 44a of the bolt 44 is in contact with the upper surface of the metal plate 42. The amount of protrusion (protruding length) of the threaded portion 44a from the lower surface of the nut plate 43 can be controlled by adjusting the tightness of the bolt 44. Namely, when the tightness of the bolt 44 is loosened, the amount of protrusion of the threaded portion 44a from the lower surface of the nut plate 43 is reduced, and when the tightness of the bolt 44 is strengthened, the amount of protrusion of the threaded portion 44a from the lower surface of the nut plate 43 is increased.

Since the tip of the threaded portion 44a of the bolt 44 is in contact with the upper surface of the metal plate 42, the bolt 44 can act to push the metal plate 42 toward the screw 3. Namely, the metal plate 42 is pressed to the elastic sheet 41 by the bolt 44. Also, the force with which the tip of the threaded portion 44a of the bolt 44 pushes the metal plate 42 can be controlled by adjusting the tightness of the bolt 44. By strengthening the tightness of the bolt 44, the amount of protrusion of the threaded portion 44a from the lower surface of the nut plate 43 can be increased, and the force with which the tip of the threaded portion 44a of the bolt 44 pushes the metal plate 42 can be increased. When the bolt 44 is tightened, the upper surface of the nut plate 43 comes into contact with the housing 26 (the bottom surface of the concave portion 27b) and acts to push the contact portion of the housing 26.

When the tip of the threaded portion 44a of the bolt 44 pushes the metal plate 42, the metal plate 42 can act to push the elastic sheet 41 toward the screw 3. When the elastic sheet 41 is pushed by the metal plate 42, the elastic sheet 41 is pressed to the surface of the screw 3, so that the sensor 23 existing between the lower surface of the elastic sheet 41 and the surface of the screw 3 is also pressed to the surface of the screw 3, and the contact between the sensor 23 and the surface of the screw 3 is improved. Namely, the metal plate 42 is pressed to the elastic sheet 41 by the bolt 44, and the sensor 23 is pressed to the screw 3 by the elastic sheet 41, so that the contact between the sensor 23 and the surface of the screw 3 can be improved.

The case in which the metal plate 42 is omitted unlike the present embodiment will be assumed. In this case, the tip of the threaded portion 44a of the bolt 44 directly pushes the elastic sheet 41. Therefore, at the position where the tip of the threaded portion 44a of the bolt 44 pushes the elastic sheet 41, the force with which the elastic sheet 41 is pressed to the surface of the screw 3 acts, but the force with which the elastic sheet 41 is pressed to the surface of the screw 3 does not act at the other positions. Namely, the force with which the elastic sheet 41 is pressed to the surface of the screw 3 is locally generated at a part of the elastic sheet 41 instead of on the entire elastic sheet 41. Therefore, the force with which the sensor 23 existing between the lower surface of the elastic sheet 41 and the surface of the screw 3 is pressed to the surface of the screw 3 is also locally generated at a part of the sensor 23 instead of on the entire sensor 23, and thus there is a risk that the contact between the 23 and the surface of the screw 3 may decrease.

On the other hand, in the present embodiment, the structure in which the tip of the threaded portion 44a of the bolt 44 pushes the metal plate 42 and the metal plate 42 pushes the elastic sheet 41 is adopted. Since the metal plate 42 instead of the tip of the threaded portion 44a of the bolt 44 is in contact with the elastic sheet 41 and pushes the elastic sheet 41, the force with which the elastic sheet 41 is pressed to the surface of the screw 3 can be generated over almost the entire elastic sheet 41. Therefore, since the force with which the sensor 23 existing between the lower surface of the elastic sheet 41 and the surface of the screw 3 is pressed to the surface of the screw 3 is also generated over almost the entire sensor 23, the contact between the sensor 23 and the surface of the screw 3 can be improved. By improving the contact between the sensor 23 and the surface of the screw 3, the state of the screw 3 can be accurately detected by the sensor 23.

Further, the case in which the metal plate 42 is not curved and is completely flat unlike the present embodiment will be assumed. In this case, the force of pushing the elastic sheet 41 becomes large at the central portion of the metal plate 42, but the force with which the metal plate 42 pushes the elastic sheet 41 decreases as the distance from the central portion of the metal plate 42 increases. Therefore, the force with which the elastic sheet 41 is pressed to the surface of the screw 3 becomes non-uniform, and the force with which the sensor 23 existing between the lower surface of the elastic sheet 41 and the surface of the screw 3 is pressed to the surface of the screw 3 also becomes non-uniform, and thus there is a risk that the contact between the sensor 23 and the surface of the screw 3 may decrease.

On the other hand, in the present embodiment, the metal plate 42 is not completely flat but is curved. Therefore, the force with which the metal plate 42 pushes the elastic sheet 41 can be made substantially uniform regardless of the position of the elastic sheet 41. As a result, the force with which the elastic sheet 41 is pressed to the surface of the screw 3 becomes substantially uniform, and the force with which the sensor 23 existing between the lower surface of the elastic sheet 41 and the surface of the screw 3 is pressed to the surface of the screw 3 also becomes substantially uniform, and thus the contact between the sensor 23 and the surface of the screw 3 can be improved. By improving the contact between the sensor 23 and the surface of the screw 3, the state of the screw 3 can be accurately detected by the sensor 23.

Further, the case in which the elastic sheet 41 is omitted and the sensor 23 is pressed to the screw 3 by the metal plate 42 unlike the present embodiment will be assumed. In this case, since the surface of the screw 3 at the position where the telemeter is attached is not a flat surface but a curved surface and the metal plate 42 is not an elastic body and is thus not easily deformed, the force with which the sensor 23 existing between the lower surface of the metal plate 42 and the surface of the screw 3 is pressed to the surface of the screw 3 may become non-uniform, and there is a risk that the contact between the sensor 23 and the surface of the screw 3 may decrease.

On the other hand, in the present embodiment, the structure in which the elastic sheet 41 made of an elastic body pushes the sensor 23 is adopted. Although the surface of the screw 3 at the position where the telemeter 11 is attached is not a flat surface but a curved surface, since the elastic sheet 41 is made of an elastic body and is easily deformed, the elastic sheet can be deformed so as to match the shape of the gap between the surface of the screw 3 and the lower surface of the metal plate 42 when the metal plate 42 pushes the elastic sheet 41 toward the screw 3. Therefore, the force with which the sensor 23 existing between the lower surface of the elastic sheet 41 and the surface of the screw 3 is pressed to the surface of the screw 3 can be made substantially uniform, and thus the contact between the sensor 23 and the surface of the screw 3 can be improved. By improving the contact between the sensor 23 and the surface of the screw 3, the state of the screw 3 can be accurately detected by the sensor 23.

Further, the case in which the sensor 23 is attached to the surface of the screw 3 by using an adhesive unlike the present embodiment will be assumed. In this case, once the sensor 23 is attached to the screw 3, the sensor 23 cannot be removed from the screw 3 later. Also, even if the adhesive can be removed with a solvent or the like, the sensor 23 needs to be replaced, which significantly impairs usability.

On the other hand, in the present embodiment, the structure in which the sensor 23 is not attached to the surface of the screw 3 by using an adhesive, but the sensor 23 is pressed to the surface of the screw 3 is adopted. Therefore, when the telemeter 11 is removed from the screw 3, the sensor 23 does not remain attached to the surface of the screw 3, and the sensor 23 can be removed together with the telemeter 11.

In the present embodiment, as described above, since the metal plate 42 pushes the elastic sheet 41 and the elastic sheet 41 presses the sensor 23 to the surface of the screw 3, the contact between the sensor 23 and the surface of the screw 3 can be improved. By improving the contact between the sensor 23 and the surface of the screw 3, the state of the screw can be accurately detected by the sensor 23. Further, since the contact between the sensor 23 and the surface of the screw 3 can be efficiently improved with a small force, the load applied to the housing 26 (26a, 26b) can be suppressed. Therefore, damage to the housing 26 made of resin can be suppressed or prevented.

The sensor 23, the elastic sheet 41, the metal plate 42, and the nut plate 43 are arranged in this order from the side closer to the surface of the screw 3. Therefore, the sensor 23, the elastic sheet 41, the metal plate 42, and the nut plate 43 are arranged (accommodated) in the concave portion 27 provided on the inner surface side of the housing 26. The concave portion 27 is composed of a concave portion 27a and a concave portion 27b provided on the bottom surface of the concave portion 27a and having the same planar dimension (plane area) as the concave portion 27a or a smaller planar dimension (plane area) than the concave portion 27a. The sensor 23, the elastic sheet 41, and the metal plate 42 are arranged (accommodated) in the concave portion 27a, and the nut plate 43 is arranged (accommodated) in the concave portion 27b. Also, a hole (through hole) 45 penetrating the housing 26 is formed at the bottom surface of the concave portion 27b, and the head portion 44b of the bolt 44 is arranged (accommodated) in the hole 45. Consequently, the tightness of the bolt 44 can be adjusted from the outer surface side of the housing 26. Further, a bolt 44 coated with an adhesive can also be used as the bolt 44, whereby it is possible to prevent the bolt 44 from being loosened due to vibrations of the machine or the like after the bolt 44 is tightened.

Figure 9:
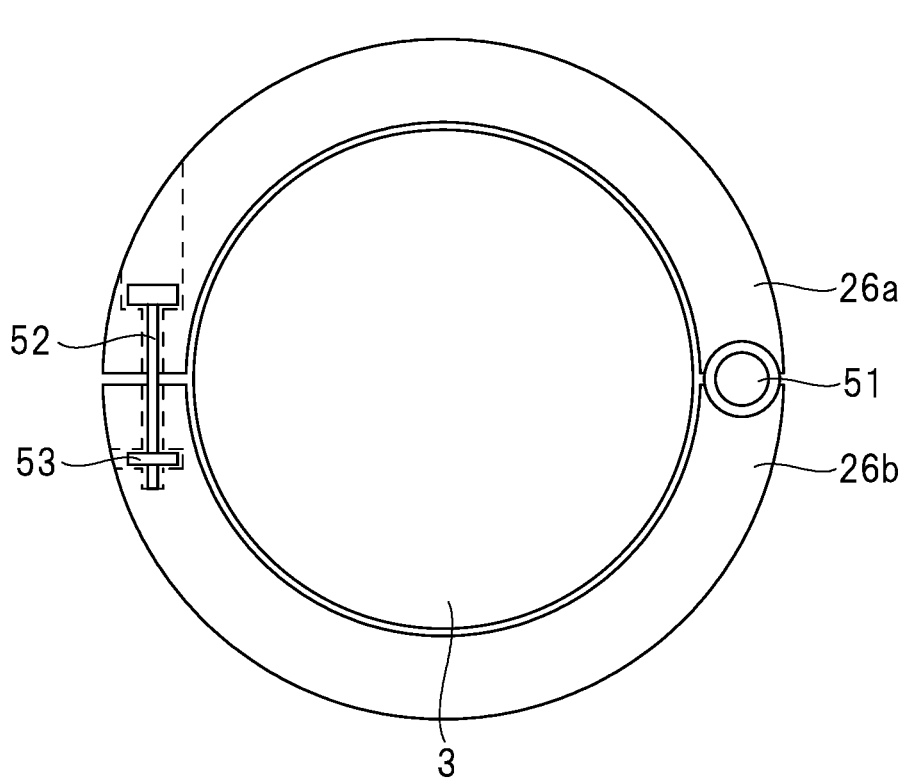
FIG. 9 is a cross-sectional view showing the principal part of the molding machine according to the embodiment.

Next, an example of the mechanism for attaching (fixing) the telemeter 11 to the screw 3 will be described with reference to FIG. 9. FIG. 9 is a cross-sectional view showing the principal part of the molding machine 1 and is a cross-sectional view of the telemeter 11 and the screw 3 at the position where the telemeter 11 is attached to the screw 3. Although FIG. 9 is a cross-sectional view, the hatching is omitted in order to make the drawing easier to see.

In the state where the telemeter 11 is attached to the screw 3, the telemeter 11 has a ring-like (cylindrical) shape enclosing the screw 3. However, in order to make it easy to attach and detach the telemeter 11 to and from the screw 3, the telemeter 11 has the configuration composed of a plurality of (two in this case) separate ring-like members. Namely, the housing 26 constituting the telemeter 11 is composed of a plurality of housings, and is composed of a pair of (two) housings 26a and 26b in this case. The telemeter 11 is attached to the screw 3 by sandwiching the screw 3 by the pair of housings 26a and 26b. This will be specifically described below.

In the case of FIG. 9, a common hinge pin (pin) 51 penetrates a hinge portion provided at one end of the housing 26a and a hinge portion provided at one end of the housing 26b. Consequently, one end of the housing 26a and one end of the housing 26b are coupled via the hinge pin 51. Therefore, before the housings 26a and 26b are attached to the screw 3, the housings 26a and 26b can rotate about the hinge pin 51 as an axis. The other end of the housing 26a and the other end of the housing 26b are coupled by a bolt (screw, screw member) 52 and a nut 53.

When removing the telemeter 11 from the screw 3, the telemeter 11 can be removed from the screw 3 by removing the bolt 52 from the screw holes of the housings 26a and 26b and rotating the housing 26a and the housing 26b about the hinge pin 51 as an axis.

Also, when attaching the telemeter 11 to the screw 3, the housing 26a and the housing 26b are rotated about the hinge pin 51 to sandwich the screw 3 between the housing 26a and the housing 26b, and then the bolt 52 is inserted into the screw holes of the housings 26a and 26b, thereby fixing the housing 26a and the housing 26b by the bolt 52 and the nut 53. Consequently, the housings 26a and 26b are fixed to the screw 3 in a state where the screw 3 is sandwiched between the housing 26a and the housing 26b. Further, after the housings 26a and 26b are attached to the screw 3, the sensor 23 can be pressed to the screw 3 by tightening the pressing bolt 44 with a constant (predetermined) torque.

Also, in the present embodiment, the case where one end of the housing 26a and one end of the housing 26b are coupled by using the hinge portions and the hinge pin 51 has been described. As another aspect, it is also possible to fix the housing 26a and the housing 26b, which sandwich the screw 3, by using the same bolt and nut as the bolt 52 and the nut 53 instead of the hinge portions and the hinge pin 51.

Each of the power receiving coil 21, the AC/DC converter 22, the processor 24, and the data transmitting coil 25 is arranged (incorporated) in either the housing 26*a* or the housing 26*b*. In the case of FIG. 6, the case in which the AC/DC converter 22 and the data transmitting coil 25 are arranged (incorporated) in the housing 26*a* and the power receiving coil 21 and the processor 24 are arranged (incorporated) in the housing 26*b* is shown as an example, but the present invention is not limited to this. The wiring in the housing 26*a* is used for electrically connecting the components in the housing 26*a*, and the wiring in the housing 26*b* is used for electrically connecting the components in the housing 26*b*. Also, it is possible to electrically connect the components in the housing 26*a* and the components in the housing 26*b* by making the terminal at the end of the housing 26*a* and the terminal at the end of the housing 26*b* come into electrical contact with each other in the state where the housings 26*a* and 26*b* are attached to the screw 3.

Further, the telemeter 11 includes one or more sensors 23, and at least one sensor 23 is arranged in at least one of the housing 26*a* and the housing 26*b*. In the case of FIG. 6, the case in which the sensor 23 is arranged in each of the housings 26*a* and 26*b* is shown as an example. By arranging the sensor 23 in each of the housings 26*a* and 26*b*, it becomes easy to detect the deformation (strain) of the screw. In this case, it is preferable to arrange the sensors 23 at positions symmetrical with respect to the center (rotation center axis) of the screw 3.

When a bridge circuit (Wheatstone bridge circuit) is formed as a circuit for detecting the deformation (strain) of the screw 3, four resistor elements are required. In this case, if one sensor 23 has only one resistor element, a total of four sensors 23 are required, and if one sensor 23 has two resistor elements, a total of two sensors 23 are required, and if one sensor 23 has four resistor elements, only one sensor 23 is required. When the telemeter 11 has one sensor 23, the sensor 23 can be arranged in either the housing 26*a* or the housing 26*b*. Also, when the telemeter 11 has two sensors 23, for example, one sensor 23 can be arranged in each of the housing 26*a* and the housing 26*b*. Further, when the telemeter 11 has four sensors 23, for example, two sensors 23 can be arranged in each of the housing 26*a* and the housing 26*b*. Other sensor arrangements and the change in the number of resistor elements for each sensor are also possible.

The case in which a battery is incorporated in the telemeter 11 instead of the power receiving coil 21 arranged in the telemeter 11 and the telemeter 11 is operated by using the battery unlike the present embodiment will be assumed. In this case, there is a limit to the size of the battery capable of being incorporated in the telemeter, and thus the battery capacity is limited. Therefore, the telemeter cannot be operated continuously for a long time. Accordingly, when the molding machine is continuously operated for a long time, the state of the screw of the molding machine cannot be constantly monitored (detected) by the telemeter. In addition, since the rotation speed of the screw of the molding machine is relatively high, it is necessary to increase the measurement frequency by the telemeter. However, in that case, the power consumption is also increased and the battery life is shortened, so that the operable time of the telemeter will be shortened. Also in this respect, when the molding machine is continuously operated for a long time, the state of the screw of the molding machine cannot be constantly monitored (detected) by the telemeter.

On the other hand, in the present embodiment, the telemeter 11 has the power receiving coil 21, and power is wirelessly supplied from the base unit 12 to the telemeter 11 by using the power transmitting coil 32 of the base unit 12 and the power receiving coil 21 of the telemeter 11. Therefore, the power source for operating the telemeter 11 can be arranged outside the telemeter 11 instead of inside the telemeter 11. Consequently, since power can be constantly supplied to the telemeter 11 wirelessly, the telemeter 11 can be continuously operated for a long time. As a result, when the molding machine 1 is continuously operated for a long time, the state of the screw 3 of the molding machine 1 can be constantly monitored (detected) by the telemeter 11. As another aspect, periodically charging a power storage element such as a battery or a capacitor wirelessly is possible as a form of the wireless power supply.

Further, the case in which power is supplied to the telemeter 11 by wire instead of wirelessly unlike the present embodiment will be assumed. In this case, the external power source and the telemeter are connected by wiring (external wiring), but since the wiring is entangled when the screw rotates, it is difficult to rotate the screw without the wiring getting in the way. Although it may be possible to supply power by wire if a sliding component such as a brush is used, this is not desirable from the viewpoint of component wear, stability, and complexity. Therefore, it becomes difficult to detect the state of the rotating screw.

On the other hand, in the present embodiment, the telemeter 11 has the power receiving coil 21, and power is wirelessly supplied from the base unit 12 to the telemeter 11 by using the power transmitting coil 32 of the base unit 12 and the power receiving coil 21 of the telemeter 11. Therefore, since it is not necessary to connect the external power source and the telemeter 11 by wiring (external wiring), the wiring is not entangled when the screw 3 rotates. Therefore, the state of the rotating screw 3 can be accurately monitored (detected) by the telemeter 11.

Further, in the present embodiment, it is preferable that the telemeter 11 is attached to the screw 3 between the rear end of the cylinder 2 and the joint 8. Namely, it is preferable that the telemeter 11 is attached to the screw 3 outside the cylinder 2 and at a position as close as possible to the rear end of the cylinder 2. As a result, since the position of the screw 3 to which the telemeter 11 is attached can be brought closer to the portion of the screw 3 located in the cylinder 2, the state of the screw 3 detected by the telemeter 11 accurately reflects the state of the portion of the screw 3 located in the cylinder 2. Therefore, the state of the screw 3 in the cylinder 2 can be known from the data detected by the telemeter 11.

Further, in the present embodiment, the telemeter 11 can be attached to and detached from the screw 3. Namely, the telemeter 11 is detachably attached to the screw 3. Therefore, it is also possible to attach the telemeter 11 to the screw 3 after using the molding machine for a while without attaching the telemeter 11 to the screw 3. Namely, the telemeter 11 can be attached later.

Next, the outline of the operation of the molding machine 1 shown in FIG. 1 to FIG. 4 will be described.

In the molding machine 1, the resin (thermoplastic resin) supplied into the cylinder 2 from the raw material input port (not shown) is melted in the cylinder 2 while being sent forward by the rotation of the screw 3 (that is, changed into the molten resin). When the filler is supplied into the cylinder 2 from the filler supply device (not shown), the resin (molten resin) and the filler are kneaded in the cylinder 2 of the molding machine 1 by the rotation of the screw 3, so that the molten resin in the cylinder 2 is brought into a state of containing the filler.

In the molding machine 1, the molten resin sent forward in the cylinder 2 by the rotation of the screw 3 is extruded from the die 5 attached to the tip of the cylinder 2. The molten resin extruded from the die 5 is cooled to become a resin molded product.

When the molding machine 1 is not an extruder but is an injection molding machine, the molten resin is injected into the mold from the tip of the cylinder 2 and the molten resin is solidified in the mold to form a resin molded product.

In the molding machine 1, the screw 3 in the cylinder 2 is rotated, and the resin is kneaded by the screw 3. Therefore, a mechanical load and a thermal load are applied to the screw 3. Accordingly, there is a risk that the strain occurs in the screw 3 and the screw 3 is deformed during the use of the molding machine 1. Therefore, by attaching the telemeter 11 to the screw 3 and monitoring (detecting) the state of the screw 3, if an abnormality occurs in the screw 3 (deformation of the screw 3 beyond the reference value or the like), it can be promptly detected. This facilitates the management of the molding machine 1 and the management of the manufacturing process using the molding machine 1.

(Second Embodiment)

Figure 10:
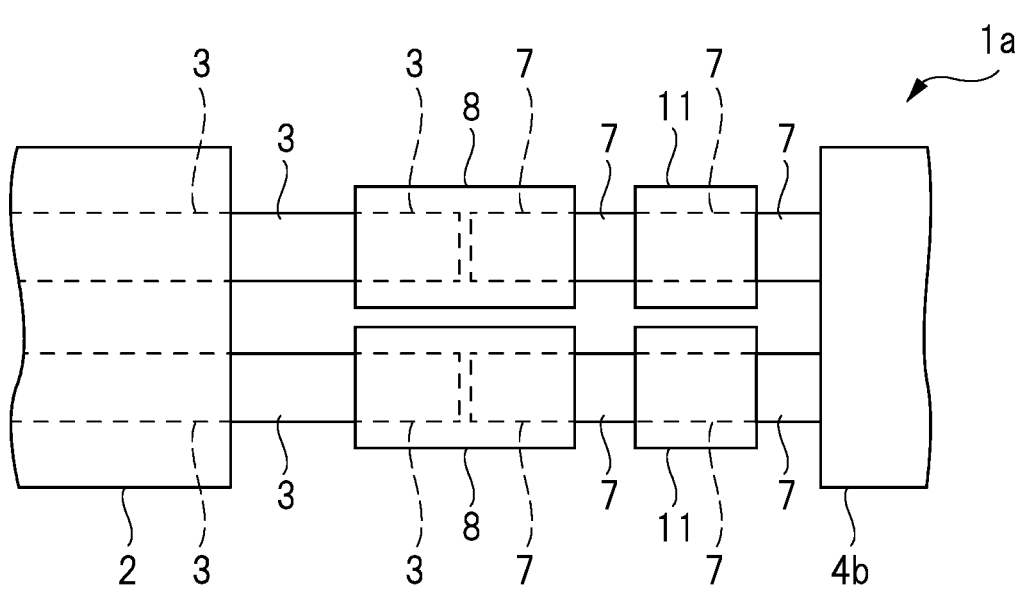
FIG. 10 is a plan view showing the principal part of a molding machine according to another embodiment.

FIG. 10 is a plan view showing the principal part of the molding machine 1 according to the second embodiment, and corresponds to the above-mentioned FIG. 3 of the first embodiment. The molding machine 1 according to the second embodiment is referred to as a molding machine 1*a* by applying a reference character 1*a* thereto.

The molding machine 1*a* according to the second embodiment differs from the molding machine 1 according to the first embodiment in the attachment position of the telemeter 11. Namely, in the second embodiment, the telemeter 11 is attached to a shaft (here, the output shaft 7) coupled to the screw 3 outside the cylinder 2 instead of the screw 3 itself. Since the second embodiment is almost the same as the first embodiment other than that, the repetitive description thereof is omitted here.

When the screw 3 is deformed, the shaft (here, the output shaft 7) coupled to the screw 3 outside the cylinder 2 tends to be deformed in accordance with the deformation. Therefore, in the second embodiment, the state (deformation, shape change) of the shaft (here, the output shaft 7) coupled to the screw 3 is detected by the sensor 23 of the telemeter 11 by attaching the telemeter 11 to the shaft (the output shaft 7), and the state (deformation, shape change) of the screw 3 can be indirectly detected based on the data. Accordingly, not only the case in which the telemeter 11 is attached to the screw 3 itself as in the first embodiment, but the case in which the telemeter is attached to the shaft (here, the output shaft 7) coupled to the screw 3 as in the second embodiment is also effective.

However, in the case in which the telemeter 11 is attached to the screw 3 itself as in the first embodiment, the state (deformation, shape change) of the screw 3 can be directly detected, and the state of the screw 3 can be known more accurately. Therefore, the case of the first embodiment described above is more advantageous than the case of the second embodiment in that the state of the screw 3 can be detected more accurately. On the other hand, when it is difficult to secure a space for attaching the telemeter 11 to the screw 3, the telemeter 11 can be attached to the shaft (here, the output shaft 7) coupled to the screw 3 as in the second embodiment.

(Third Embodiment)

Figure 11:
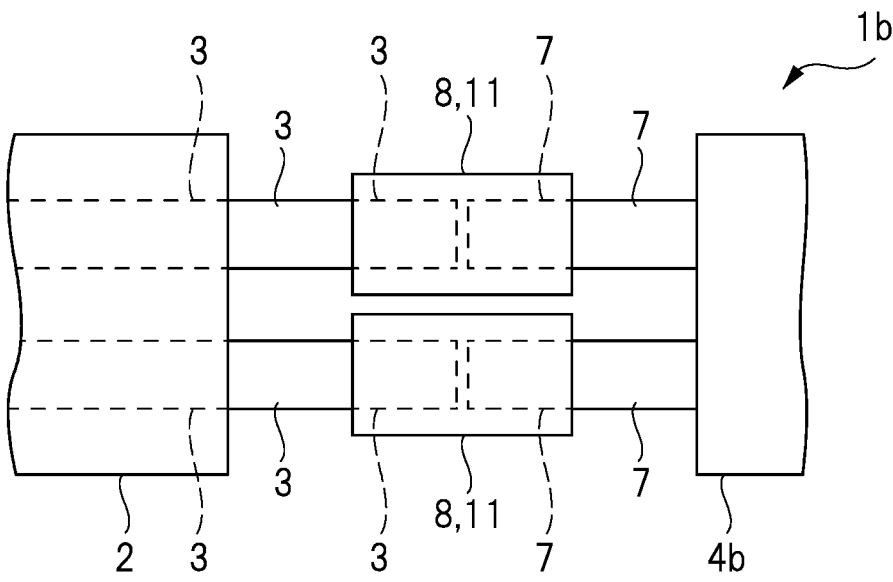
FIG. 11 is a plan view showing the principal part of a molding machine according to another embodiment.

FIG. 11 is a plan view showing the principal part of the molding machine 1 according to the third embodiment, and corresponds to the above-mentioned FIG. 3 of the first embodiment. The molding machine 1 according to the third embodiment is referred to as a molding machine 1*b* by applying a reference character 1*b* thereto.

The molding machine 1*b* according to the third embodiment differs from the molding machine 1 according to the first embodiment in that the telemeter 11 and the joint 8 are separately provided in the first embodiment whereas the telemeter 11 and the joint 8 are integrated in the third embodiment.

For example, it is possible to make the joint 8 have the function of the telemeter 11 by incorporating various components constituting the telemeter 11 into the joint 8. Alternatively, it is also possible to couple the screw 3 and the output shaft 7 by the telemeter 11 by making the telemeter 11 have the function of the joint 8. In these cases, as shown in FIG. 11, the telemeter 11 serving also as the joint 8 (in other words, the joint 8 serving also as the telemeter 11) is attached to both the screw 3 and the output shaft 7 so as to couple the end of the screw 3 and the end of the output shaft 7.

In the case of the third embodiment, since the telemeter 11 and the joint 8 are integrated, it is not necessary to separately secure a space for attaching the joint and a space for attaching the telemeter. Therefore, the third embodiment is effective when it is difficult to secure a space for attaching the telemeter separately from a space for attaching the joint.

On the other hand, in the case of the first embodiment described above, since the telemeter 11 and the joint 8 are separately provided, a structure suitable for exhibiting the required function can be adopted for each of the telemeter 11 and the joint 8. Therefore, it becomes easy to prepare the telemeter 11 and the joint 8 having good performance (function).

In the foregoing, the invention made by the inventors of the present invention has been specifically described based on the embodiments. However, it is needless to say that the present invention is not limited to the foregoing embodiments and various modifications can be made within the range not departing from the gist thereof.

REFERENCE SIGNS LIST

1 molding machine
2 cylinder
3 screw
4 rotation drive mechanism
4*a* motor
4*b* speed reducer
5 die
7 output shaft
8 joint
11 telemeter
12 base unit
21 power receiving coil
22 AC/DC converter
23 sensor
24 processor
25 data transmitting coil
26, 26*a*, 26*b* housing
27, 27*a*, 27*b* concave portion
31 oscillator
32 power transmitting coil
33 data receiving coil 34 AD converter
35 processor
36 power source
37 personal computer
41 elastic sheet
42 metal plate
43 nut plate
43a screw hole
44 bolt
44a threaded portion
44b head portion
45 hole
46 wiring
51 hinge pin
52 bolt
53 nut

The invention claimed is:

1. A molding machine comprising:
a cylinder;
a screw built in the cylinder;
a telemeter; and
a base unit arranged at a position facing the telemeter, the telemeter and the base unit not being connected by wiring,
wherein the telemeter includes a first sensor and a second sensor for detecting a state of the screw,
wherein a housing of the telemeter is composed of a pair of housing portions made of a non-conductor,
wherein the telemeter is attached to the screw by sandwiching the screw by the pair of housing portions outside the cylinder,
wherein the first sensor is arranged in one of the pair of housing portions,
wherein the second sensor is arranged in the other of the pair of housing portions,
wherein the first sensor and the second sensor are arranged at positions symmetrical to each other with respect to a rotation center axis of the screw,
wherein the first and second sensors are pressed to the screw so as to be in direct contact with the screw,
wherein a power receiving coil, a processor, and a data transmitting coil are embedded in the housing of the telemeter or are arranged in concave portions formed in the housing of the telemeter, and
wherein the base unit includes a power transmitting coil configured to wirelessly supply power from an external power source to the power receiving coil of the telemeter, a data receiving coil configured to wirelessly receive data from the data transmitting coil of the telemeter, and a processor configured to process and transmit the received data to a data receiving device external to the molding machine.

2. The molding machine according to claim 1,
wherein the housing of the telemeter is made of a resin.

3. The molding machine according to claim 1,
wherein the first and second sensors detect deformation of the screw.

4. The molding machine according to claim 3,
wherein the first and second sensors are strain gauges.

5. The molding machine according to claim 1,
wherein the telemeter further includes elastic sheets, and
wherein each of the first and second sensors is located between a corresponding elastic sheet and the screw and is pressed to the screw by the elastic sheet.

6. The molding machine according to claim 5,
wherein the telemeter further includes metal plates, and
wherein one of the metal plates is located on a surface of the elastic sheet on an opposite side of a surface in contact with the first sensor and is pressed to the elastic sheet, and another metal sheet is located on a surface of the elastic sheet on an opposite side of a surface in contact with the second sensor and is pressed to the elastic sheet.

7. The molding machine according to claim 6,
wherein surfaces of the metal plates in contact with the elastic sheets are curved surfaces.

8. The molding machine according to claim 7,
wherein the telemeter further includes screw members, and
wherein the metal plates are pressed to the elastic sheets by the screw members.

9. The molding machine according to claim 8,
wherein the telemeter further includes nuts in which the screw members are inserted, and
wherein the nuts are plate shaped and are in contact with the housing of the telemeter.

10. The molding machine according to claim 1,
wherein a first portion of the screw protrudes from an upstream side end of the cylinder, and
wherein the telemeter is attached to the first portion of the screw.

11. The molding machine according to claim 1,
wherein the external power source is a wireless power supply or an environmental power generation.

12. The molding machine according to claim 1, further comprising:
another screw which is the same as the screw,
wherein the telemeter is attached to each of the two screws.

13. A molding machine comprising:
a cylinder;
a screw built in the cylinder;
a shaft coupled to the screw outside the cylinder;
a telemeter; and
a base unit arranged at a position facing the telemeter, the telemeter and the base unit not being connected by wiring,
wherein the telemeter includes a first sensor and a second sensor for detecting a state of the screw,
wherein a housing of the telemeter is composed of a pair of housing portions made of a non-conductor,
wherein the telemeter is attached to one or both of the screw and the shaft by sandwiching one or both of the screw and the shaft by the pair of housing portions outside the cylinder,
wherein the first sensor is arranged in one of the pair of housing portions,
wherein the second sensor is arranged in the other of the pair of housing portions,
wherein the first sensor and the second sensor are arranged at positions symmetrical to each other with respect to a rotation center axis of the screw or the shaft,
wherein the first and second sensors are pressed to the screw so as to be in direct contact with the screw,
wherein a power receiving coil, a processor, and a data transmitting coil are embedded in the housing of the telemeter or are arranged in concave portions formed in the housing of the telemeter, and
wherein the base unit includes a power transmitting coil configured to wirelessly supply power from an external power source to the power receiving coil of the telemeter, a data receiving coil configured to wirelessly receive data from the data transmitting coil of the telemeter, and a processor configured to process and transmit the received data to a data receiving device external to the molding machine.

14. The molding machine according to claim 13, further comprising:

a motor; and a speed reducer connected to the motor, wherein the shaft is an output shaft of the speed reducer.

15. A molding machine comprising:

a cylinder;

two screws built in the cylinder;

two telemeters attached to the two screws, respectively, outside the cylinder; and a base unit arranged at a position facing the telemeters, the telemeters and the base unit not being connected by wiring, wherein each of the two telemeters includes a first sensor and a second sensor for detecting a state of the attached screw, wherein each housing of the two telemeters is composed of a pair of housing portions made of a non-conductor, wherein each of the two telemeters is attached to the screw by sandwiching the screw by the pair of housing portions outside the cylinder, wherein the first sensor is arranged in one of the pair of housing portions and the second sensor is arranged in the other of the pair of housing portions in each of the two telemeters, wherein the first sensor and the second sensor are arranged at positions symmetrical to each other with respect to a rotation center axis of the screw in each of the two telemeters, wherein the first and second sensors are pressed to the screw so as to be in direct contact with the screw in each of the two telemeters, wherein a power receiving coil, a processor, and a data transmitting coil are embedded in the housing of each telemeter or are arranged in concave portions formed in the housing of each telemeter, and wherein the base unit includes a power transmitting coil configured to wirelessly supply power from an external power source to the power receiving coils of the telemeters, a data receiving coil configured to wirelessly receive data from the data transmitting coils of the telemeters, and a processor configured to process and transmit the received data to a data receiving device external to the molding machine.

* * * * *